United States Patent [19]

Kakuda

[11] Patent Number: 4,503,487
[45] Date of Patent: Mar. 5, 1985

[54] SHOCK-CUSHIONED LAMP MOUNTING STRUCTURE FOR USE IN A VEHICLE

[75] Inventor: Yosiro Kakuda, Toyota, Japan

[73] Assignee: Toyota Jidosha Kabushiki Kaisha, Japan

[21] Appl. No.: 541,250

[22] Filed: Oct. 12, 1983

[30] Foreign Application Priority Data

Nov. 18, 1982 [JP] Japan ............................ 57-174761[U]

[51] Int. Cl.$^3$ ............................................. B60Q 1/00
[52] U.S. Cl. .................................... 362/80; 362/249; 362/294; 362/311; 362/369; 362/373; 362/390; 362/376; 362/378
[58] Field of Search ................. 362/80, 249, 294, 311, 362/369, 373, 390, 376, 378

[56] References Cited

U.S. PATENT DOCUMENTS

| | | | |
|---|---|---|---|
| 3,935,445 | 1/1976 | Preisler | 362/355 |
| 4,357,650 | 11/1982 | Kano | 362/82 X |
| 4,380,793 | 4/1983 | Potts | 362/267 |

OTHER PUBLICATIONS

Japanese Laid Open Utility Model Publication Sho 56-70345.
Japanese Utility Model Publication Sho 57-10914.

Primary Examiner—Stephen J. Lechert, Jr.
Attorney, Agent, or Firm—Parkhurst & Oliff

[57] ABSTRACT

A shock-cushioned lamp mounting structure for use as a license plate illuminator, installed on a vertically rotatable rear door. The shock-cushioned mounting structure includes a housing for a license plate lamp, a light bulb mounted in a lamp socket assembly, and means for absorbing the shock generated from the opening and closing of the vertically rotatable rear door.

6 Claims, 7 Drawing Figures

SHOCK-CUSHIONED LAMP MOUNTING STRUCTURE FOR USE IN A VEHICLE

BACKGROUND OF THE INVENTION

The present invention relates to a shock-cushioned lamp mounting structure, and more particulary to a mounting structure used to contain a license plate lamp installed on a vertically rotatable rear door.

Most of the previously known license plate lamps have been installed on stationary portions of a vehicle body, such as a rear bumper or somewhere on a lower rear face of a vehicle body. However, many new vehicle designs have incorporated a large, vertically rotatable door to provide for easy accessibility into the trunk or storage area of a vehicle, and an increasing number of license plate lights have been provided on the vertically rotatable door. Therefore, the license plate lamps that has been secured onto the vertically rotatable door are subjected to physical stresses of shocks when the door is opened and closed.

The normal procedure for fixing the license plate lamp to the vehicle body is to use screws which firmly attached the assembly to the body, as shown in FIGS. 6 and 7. Hence, this direct attachment results in a transfer of the shock, generated from opening or closing the door, directly to the license plate lamp which may result in the filament of the bulb breaking or shortening the service expectancy of the lamp.

Further, the prior art of FIG. 7 indicates that the screws 56 and 57 must be removed when changing the bulb. This involves a troublesome and inconvenient procedure.

SUMMARY OF THE INVENTION

The present invention was made in view of the foregoing background and to overcome the foregoing drawbacks. It is accordingly an object of the present invention to provide a shock-cushioned mounting structure for a license plate lamp installed on a vertically rotatable rear door.

To attain the above objects, a structure for mounting a shock-cushioned license plate lamp on a face of a vertically rotatable door, utilized for loading baggage into and out of a trunk or storage area of a vehicle, according to the present invention, comprises:

a license plate lamp;

a lamp socket having projections at peripheral portions thereof, and providing means for mounting the license plate lamp at an upper portion thereof;

a lamp housing in which the lamp and socket are positioned, having an aperture adjacent to the lamp;

shock absorbing means for absorbing the shock generated when opening and closing the vertically rotatable door positioned between a mounting end of the lamp housing and the face on the vertically rotatable door;

a plate having an aperture, in which the lamp socket is inserted, the aperture having notches along the periphery thereof, which are engageable with the projections of the lamp socket, with the plate mounted on the shock absorbing means; and a fastening means for securing the lamp housing and the shock absorbing means to the face on the vertically rotatable door, whereby the lamp socket is mounted only through the shock absorbing means onto the vertically rotatable door, whereby vibrations generated from opening and closing the vertically rotatable door are absorbed by the shock absorbing means.

DETAILED DESCRIPTION OF THE PREFERRED EMBODIMENT

The present invention is described in detail with reference to the accompanying drawings which illustrate an embodiment of a shock-cushioned lamp mounting structure for a licence plate lamp installed on a vertically rotatable rear door according to the present invention.

Figure 1:
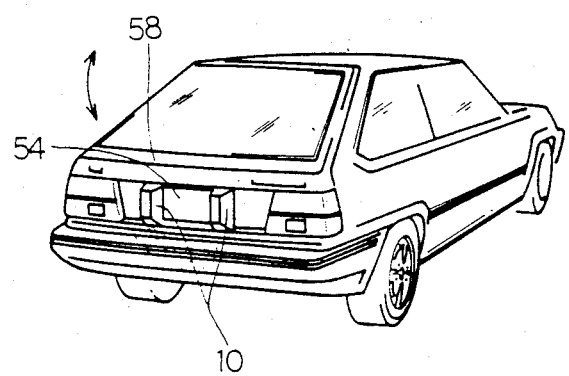
FIG. 1 is a perspective view of a vehicle having a license plate lamp on a rear portion of a vehicle body.

Referring first to FIG. 1, a general perspective view of a vehicle body is shown. On the rear portion of the body, a pair of lamp housings 10, each one containing a bulb, are secured onto the vertically rotatable back door 58, adjacent to a license plate.

Figure 2:
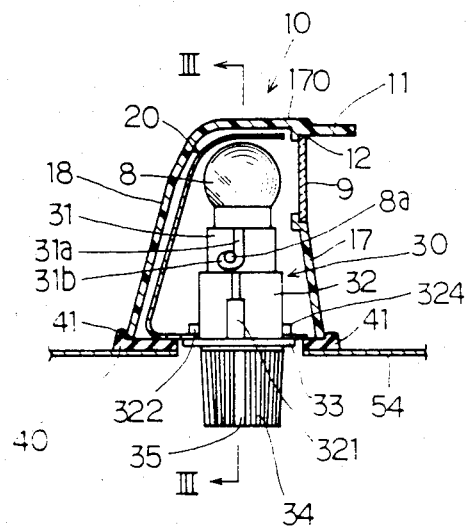
FIG. 2 is a side cross-sectional view of a shock-cushioned lamp mounting structure according to the present invention.
Figure 3:
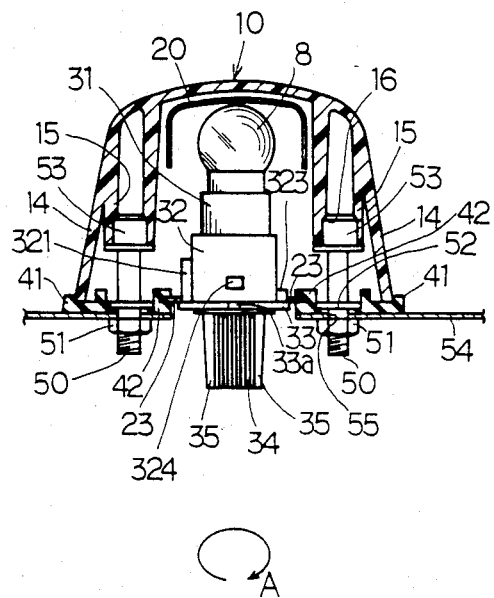
FIG. 3 is a cross-sectional view taken along the line III—III in FIG. 2.

FIGS. 2 and 3 illustrate a shock-cushioned lamp mounting structure according to the present invention. A lamp housing 10 is secured by bolts 50 to a plate 54 on the vertically rotatable door. The housing 10 is made from plastic, having a side wall 14, a front wall 17 and a back wall 18. An aperture 12 is provided and defined by the space between the upper portion 170 and the front wall 17 of the housing 10. A translucent plastic member 9 is provided in the formed aperture 12. The upper portion 170 of the lamp housing 10 extends toward the right in FIG. 2 to form a brim-like extending portion 11 which directs the transmitted light to follow a particular path resulting in the license plate being illuminated. Further provided are projecting portions 15 which inwardly project from the shoulder portion of the lamp housing 10, and have apertures 16 at the ends thereof.

A protector plate 20 and a lamp socket 30, equipped with a bulb 8 at the top thereof, are provided within the lamp housing 10, such that the protector 20 is positioned between the socket 30 and the lamp housing 10.

Figure 5:
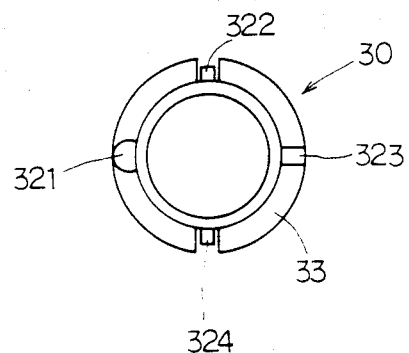
FIG. 5 is a top view of a lamp socket mounted in the lamp housing of the present invention.
Figure 6:
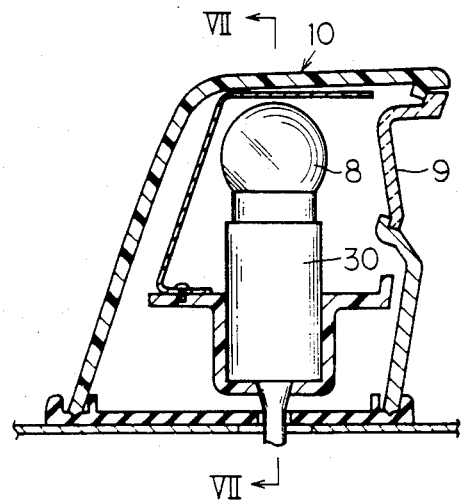
FIG. 6 is a side cross-sectional view of a lamp mounting structure according to prior art.
Figure 7:
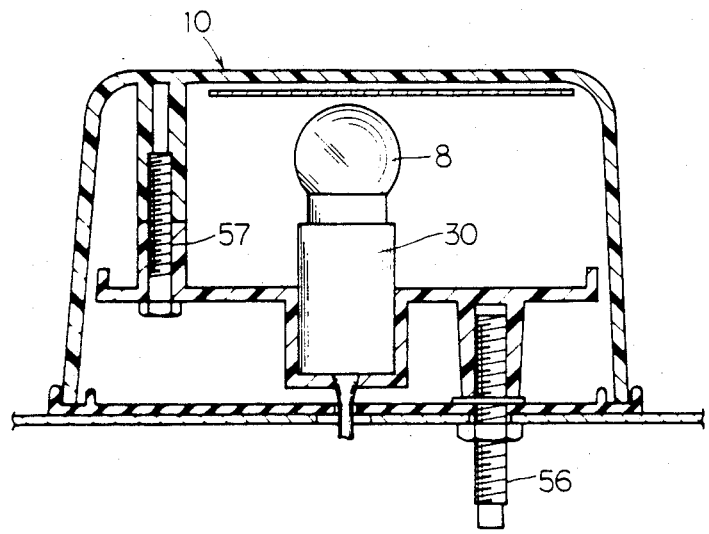
FIG. 7 is a cross-sectional view taken along the line VII—VII of FIG. 6.

The lamp socket 30 has stepped portions 31 and 32 and a grip portion 34. The first stepped portion 31 is made of metal and includes a pair of slots, provided symmetrically opposite to each other in the portion 31, comprising a longitudinal slot 31a and an enlarged lateral slot 31b, which are joined together to receive and hold a projection 8a of the bulb 8 in the socket 30. Within the stepped portion 31, a spring (not shown) is provided to upwardly bias an electrode to place it in contact with an electrode of the bulb 8. The metal stepped portion 31 is fixed to the plastic stepped portion 32. The plastic stepped portion 32 has four projections 321 through 324, at its outer circumferential portion thereof, as shown in FIG. 5. The first projection 321 is connected to a lead line from the bulb 8. The second and fourth projections 322 and 324 have clearances provided between the lower ends thereof and a flange 33, which is provided at an intermediate portion between the stepped portion 32 and the grip portion 34. The flange 33 is provided with a pair of longitudinal slots 33a, which are positioned under the second and fourth projections 322 and 324. The grip portion 34 has a pair of extensions 35, longitudinally extending at the ends thereof. The extensions 35 are positioned symmetrically opposite to each other so that one can easily rotate the socket assembly for gripping the portion 35. The outer surface between the extensions 35 is provided with a plurality of ridges longitudinally extending on the surface of the grip portion 34. The grip portion 34 is combined with the stepped portion 32 and the flange 33 to form a unitary member.

Figure 4:
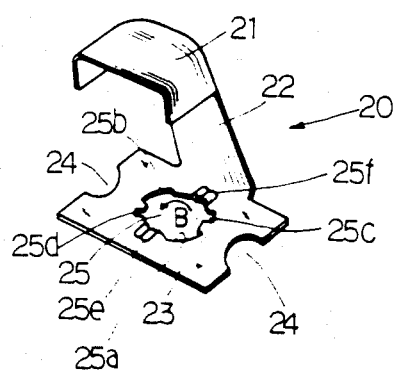
FIG. 4 is a perspective view of a heat protector provided in a lamp housing of the present invention.

FIG. 4 illustrates a perspective view of the protector device 20. The protector 20 is made of metal and comprises an upper portion 21, a protector base plate portion 23 and a bridge portion 22 connecting the upper portion 21 with the base plate portion 23. The portions 21 and 22, surround the bulb 8 and protect the plastic lamp housing 10 from the heat generated by the light bulb 8. A protector base plate portion 23 has a centrally located aperture 25 and two semi-circulr peripheral apertures therein. The aperture 25 has two wide notches 25a and 25b and two short notches 25c and 25d provided therein, as disclosed in FIG. 4. The notches 25a and 25c are provided opposite to the notches 25b and 25d, respectively. Small, upwardly projecting grooves 25e and 25f are provided at intermediate positions between the long notches 25a and 25b and the short notches 25d and 25c, on the upper surface of the plate portion 23. The groove 25e is provided opposite to the groove 25f.

A shock absorbing means 40, made of a shock absorbing material such as rubber, is positioned between the lower end of the lamp housing 10 and the plate 54 which is on the vertically rotatable rear door. A rim 41 is provided around the peripheral end portion of the means 40, into which the lower end portion of the lamp housing 10 is situated. Included with the means 40 are the enlarged inner portions 42 which have a slit provided for insertion of the ends of the plate 24 thereinto. A shaft 50 penetrates the aperture 24 of the protector 20 and the aperture 55 of the plate 54. A head portion 53 of the shaft 50 is fixed into the aperture 16 of the inward projection 16 of the lamp housing 10 by suitable means. The plate 54 is positioned between a flange 52 of the bolts 50 and the nuts 51, thereby firmly mounting the lamp housing 10 and the shock absorbing means 40 to the vehicle body.

To mount the lamp assembly of the present invention, the following procedure must be followed: the bulb 8 is downwardly pushed against the force of the spring (not shown in drawings) installed in the portion 31 using the slots 31a and 31d to guide the projections 8a of the bulb 8 into its locked position, which corresponds to the 8a projections placed in the slot 31b. The force of the spring maintains the bulb 8 in position. The shock absorbing means 40 is firmly secured to the lamp housing 10 by the nuts 51. Next, the lamp socket assembly 30, with the bulb 8, is inserted into the aperture 25 of the protector 20, such that the projections 321, 322, 323 and 324 of the socket 30 correspond to the positions of the notches 25a, 25d, 25b and 25c, respectively. Next, the socket assembly 30 is rotated in a clockwise direction "A", as viewed from underneath FIG. 3. In other words, the socket 30 is rotated in the direction "B", as shown in FIG. 4. This rotation results in the projections 322, and 324 striking on the grooves 25e and 25f of the plate portion 23, respectively, while projections 321 and 323 are rotated into the notches 25a and 25b, respectively. The socket assembly 10 is mounted on the plate portion 23 through the engagement between the projections 321, 322, 323 and 324 of the socket with the notches 25a, 25e, 25b, and 25f of the plate portion 23. The plate portion 23 of the protector 20 is mounted into the enlarged portions 42 of the shock absorbing means 40 and then firmly secured to the vehicle body. Thus, the lamp socket 30 is placed in contact with the vehicle body only through the shock absorbing means 40. Hence, the vibrations resulting from opening and closing the vertically rotatable rear door are almost entirely absorbed by the shock absorbing mean 40, whereby the bulb 8 mounted on the top of the lamp socket receives cushioned vibrations. Therefore, filament breakage is avoided and the durability of the bulb is increased.

When the need to replace an old bulb arises, the socket 30 is rotated in a counterclockwise direction, as viewed from underneath FIG. 3, resulting in the disengagement between the projections 322 and 324 of the socket and the groove 25e and 25f of the plate portion 23 of the protector 20, respectively. When the projections 322 and 324 of the socket are rotated to a position corresponding to the notches 25d and 25c respectively, the socket assembly can be easily removed from the lamp housing 10 to exhange an old bulb for a new one.

While the present invention has been described in its preferred embodiment, it is to be understood that the invention is not limited thereto but may be otherwise embodied within the scope of the following claims.

What is claimed is:

1. A structure for mounting a shock-cushioned license plate lamp on a face of a vertically rotatable rear door, comprising:
   a license plate lamp;
   a lamp socket having projections at peripheral portions thereof, and means for mounting the license plate lamp at an upper portion thereof;
   a lamp housing in which the lamp and socket are positioned, having an aperture adjacent to the lamp;
   shock absorbing means for absorbing a shock generated when opening and closing the vertically rotatable door, positioned between a mounting end of the lamp housing and a face on the vertically rotatably door;
   a protector base plate having an aperture, in which the lamp socket is inserted, the aperture having notches along the periphery thereof, which are engageable with the projections of the lamp socket, and the plate is mounted on the shock absorbing means; and
   a fastening means for securing the lamp housing and the shock absorbing means to a face on the vertically rotatable door, whereby the lamp socket is mounted only through the shock absorbing means onto the vertically rotatable door.

2. The shock-cushioned lamp mounting structure of claim 1, further comprising a protector means for shielding the lamp housing from heat created by the license plate lamp, the protector being positioned between the lamp and the lamp housing, and partially surrounding the lamp.

3. The shock-cushioned lamp mounting structure of claim 2, wherein the protector base plate is connected by a bridge portion to an upper portion of the protector, the upper portion and the bridge portion surrounding the license plate lamp.

4. The shock-cushioned lamp mounting structure of claim 3, wherein the lamp socket further comprises a grip portion, which longitudinally extends from the lower portion of the lamp socket.

5. The shock-cushioned lamp mounting structure of claim 3, wherein raised grooves are provided on the upper surface of the protector base plate and coinciding indented grooves are provided on the lower surface of the protector base plate, located between the notches in the aperture of the protector base plate.

6. The shock-cushioned lamp mounting structure of claim 5, wherein the indented grooves are placed in contact with the peripheral projections of the lamp socket, while other peripheral projections of the lamp socket rotate within the provided aperture notches.

* * * * *